(12) United States Patent
Simpson et al.

(10) Patent No.: US 7,064,853 B2
(45) Date of Patent: Jun. 20, 2006

(54) DOCUMENT PRINTING SYSTEM (75) Inventors: Shell S. Simpson, Boise, ID (US);
Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 904 days.

(21) Appl. No.: 10/032,681

(22) Filed: Oct. 23, 2001

(65) Prior Publication Data

US 2003/0076522 A1 Apr. 24, 2003

(51) Int. Cl.
*G06K 1/00* (2006.01)
*H04N 1/00* (2006.01)
*G06F 15/16* (2006.01)

(52) U.S. Cl. ............. 358/1.15; 358/1.14; 358/407; 709/217; 709/218

(58) Field of Classification Search ......... 358/1.15, 358/1.14, 407; 709/217, 218, 219; 725/112
See application file for complete search history.

(56) References Cited

U.S. PATENT DOCUMENTS 5,727,135 A * 3/1998 Webb et al. ............... 358/1.14
6,327,045 B1 * 12/2001 Teng et al. ................ 358/1.15
6,452,692 B1 * 9/2002 Yacoub ..................... 358/1.15
2001/0052995 A1 * 12/2001 Idehara .................... 358/1.15

FOREIGN PATENT DOCUMENTS

EP 0996055 A2 * 4/2000

OTHER PUBLICATIONS

U.S. Appl. No. 09/712,336, filed Nov. 13, 2000, Simpson et al.
U.S. Appl. No. 09/712,308, filed Nov. 13, 2000, Simpson et al.
U.S. Appl. No. 09/712,337, filed Nov. 13, 2000, Simpson et al.

* cited by examiner

*Primary Examiner*—Kimberly Williams
*Assistant Examiner*—Thomas J. Lett
(74) *Attorney, Agent, or Firm*—Matthew L. Wade (57) ABSTRACT

A printing system that includes a personal computer, a primary printer and an alternate printer is described. The primary printer and the alternate printer each include an embedded Web Server. The primary printer can serve a first program to the personal computer upon request. The first program enables the computer to use the primary printer to print a document. In addition, the first program enables the computer to display a hyperlink referring to a second program if the primary printer fails to successfully print the document. The second program enables the computer to print the document using the alternate printer.

19 Claims, 9 Drawing Sheets

FIG. 8

DOCUMENT PRINTING SYSTEM

BACKGROUND

A Personal computer is often connected to one or more printers over a network in order to enable document printing. Typically, in such an environment, a user of the PC prints a document by causing the PC to send a print job describing the document to one of the networked printers. The printer responds to the print job by printing the document.

Occasionally a printer that is presently processing a print job may encounter an event that results in the printer failing to successfully print the job. For example, a printer may fail to print the present job due to the depletion of some consumable, such as print media, ink, toner, etc. A printer may also fail to print the present job if certain internal components fail.

When a print job fails to print, the user may or may not wish to re-print the job using a back-up printer. For example, a user may wish to re-print a single copy print job using a back-up printer if the original printer only printed a portion of the job. A user, however, may not wish to re-print a multi-copy print job if the original printer successfully printed an adequate number of document copies prior to the job failure. Accordingly, it would be desirable to provide a user with the option of re-printing a job using a back-up printer.

SUMMARY

According to one embodiment, the invention provides a computer implemented method of printing a document. The method may include, for example, initiating the printing of the document by a first printer, detecting that the first printer has encountered an event and displaying a selectable link referring to a network resource that enables the computer to print at least a portion of the document using a second printer.

According to another embodiment, the invention provides a server. The server may include, for example, apparatus to receive a request from a computer and apparatus to respond to the request by transmitting a first program of computer readable instructions to the computer. The first program enables the computer to: initiate the printing of a document by a first printer; detect if the first printer encounters an event while printing the document; and if the event is detected, display a selectable link referring to a second program of instructions that enables the computer to use an alternate printer to print at least a portion of the document.

According to another embodiment, the invention provides a computer readable medium embodying a program of instructions for causing a computer to perform method steps. The method steps may include, for example, detecting that a first printer has encountered an event while the first printer is processing a print job; and in response to detecting the event, displaying a selectable link referring to a network resource that enables the computer to initiate the printing of at least a portion of the document using a second printer.

According to yet another embodiment, the invention provides a printing device. The printing device includes apparatus to respond to a pre-defined request received over a network from a computer by transmitting a first program of computer readable instructions to the computer. The first program for enabling the computer to: initiate the printing of a document by using the printing device; detect if the first printing device encounters an event while printing the document; and if the event is detected, display a selectable link referring to a second program of instructions that enables the computer to use an alternate printer to print at least a portion of the document.

Other aspects and advantages of the present invention will become apparent from the following detailed description, taken in conjunction with the accompanying drawings, illustrating by way of example the principles of the invention.

DESCRIPTION

As used herein, the phrase "Web content" refers to a program of computer readable instructions that may be executed by a Web Browser. Thus, for example, Web content may be a set of instructions written in any of the following languages (the following is a non-exhaustive list): HTML, Java, JavaScript, C-Sharp code, etc.

Additionally, it is known in the art that Web pages often include one more "hyperlinks". Typically, a hyperlink is displayed on a Web page as a highlighted word or phrase. A hyperlink may also appear as a graphic. In order to activate a hyperlink, a user typically selects it by using a pointer device, such as a mouse.

It is also known in the art that hyperlinks may be configured to cause a computer to perform various functions. For example, a Web page (presently being displayed by a Browser) may include a hyperlink that refers to another Web page (target page) that is located on a remote server. Selecting the hyperlink causes the Browser to retrieve the target page from the remote server and to display it. This same hyperlink may also include parameters that are passed to the server when the target page is requested.

Figure 1:
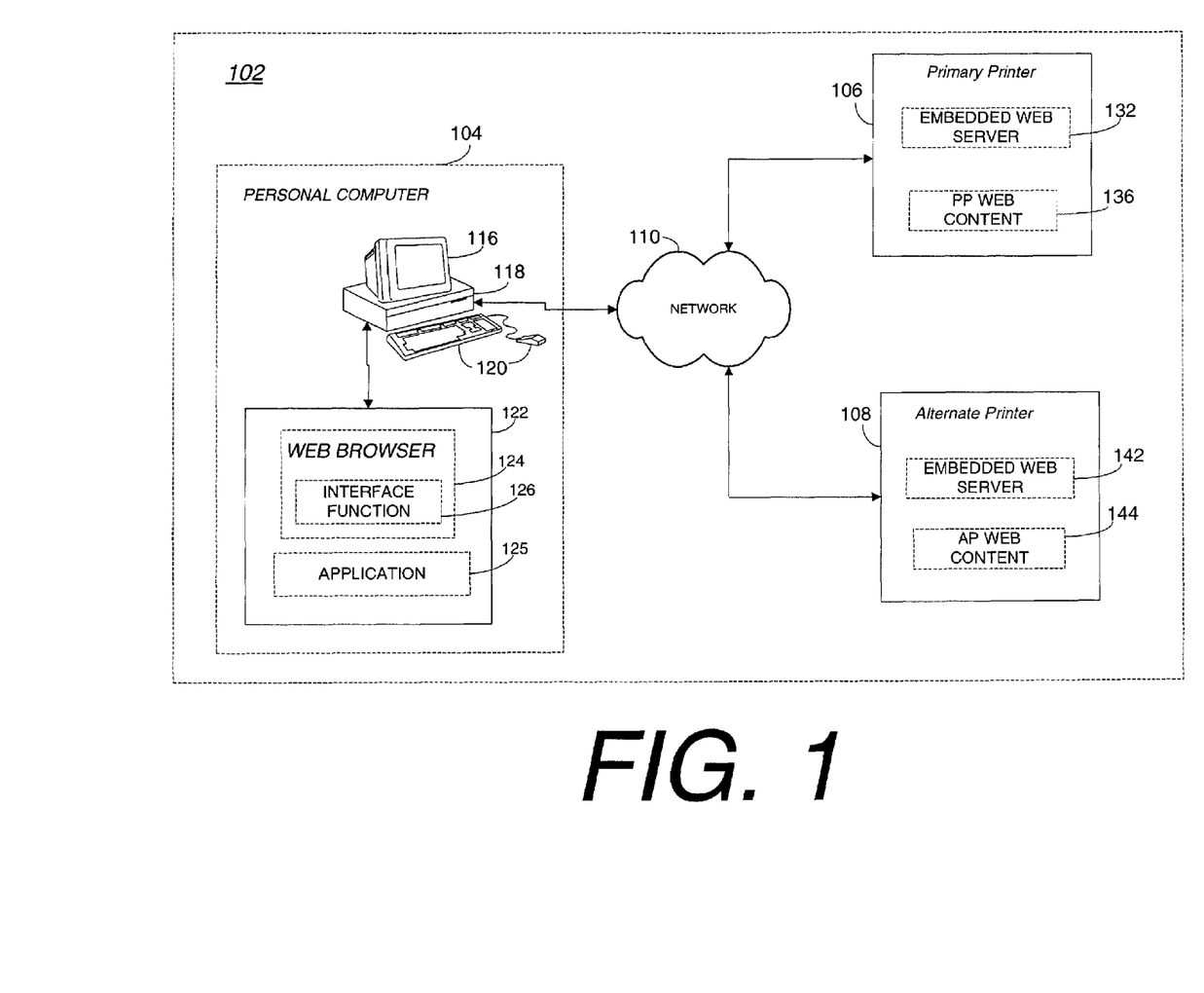
FIG. 1 is a block diagram of a computing system that incorporates an embodiment of the invention.

As shown in FIG. 1, for purposes of illustration, the invention is embodied in a novel computing system 102. The computing system 102 includes a personal computer (PC) 104, a "primary" printer 106 and an "alternate" printer 108 all connected to a network 110. The network 110 may represent, for example, an Intranet, a series of networks, the public Internet, a wireless network(s), etc., or some combination thereof.

In this embodiment, the PC 104 runs a local operating system, such as a version of Windows or Windows NT. In order for a user to access the PC 104, the user first logs on. This involves the user establishing his/her online identity by inputting a user name and a password. For ease of discussion, a user presently logged into the PC 104 may be referred to as the "active user".

As shown, the PC 104 includes a display monitor 116, a processing unit 118, user input devices 120 and a memory 122. Stored in the memory 122 are a Web Browser 124 and a word processing application 125. The processing unit 118 can retrieve and execute these two applications upon receiving an appropriate request from the user. The Web Browser 124 enables the PC 104 to run Web content and function as a Web client in the system 102.

The Web browser 124 includes a program interface function (PI function) 126. Web content running in the browser 124 can call the PI function 126 in order to access a particular electronic document. For ease of discussion, the document accessed by use of the PI function 126 may be referred to herein as the "active job document".

It is noted that the call to invoke the PI function 126 is device independent and is in accordance with a pre-defined standard. For ease of discussion, this standard will be referred to herein as the "Web imaging standard". The standard call to invoke the PI function 126 may be referred to herein as the "Web image" call.

In the present embodiment, each user of the PC 104 can make a document his/her own job document. From this group of documents, the document that qualifies as the "active job document", at any point in time, is the one belonging to the active user. Thus, for example, assume user "A" makes document "A" his/her job document. Assume also that user "B" makes document "B" his/her job document. Under these conditions, when user "A" is the active user, the PI function 126 operates to link Web content to document "A". When, however, user "B" is the active user, the PI function 126 operates to link WEB content to document "B".

It is noted that a user may use the word processing application 125 to make a job document. It is also noted that other applications that run on the PC 104 may also provide a user with the ability to make a job document. Web content may also be configured to allow a user to make a job document.

Figure 2:
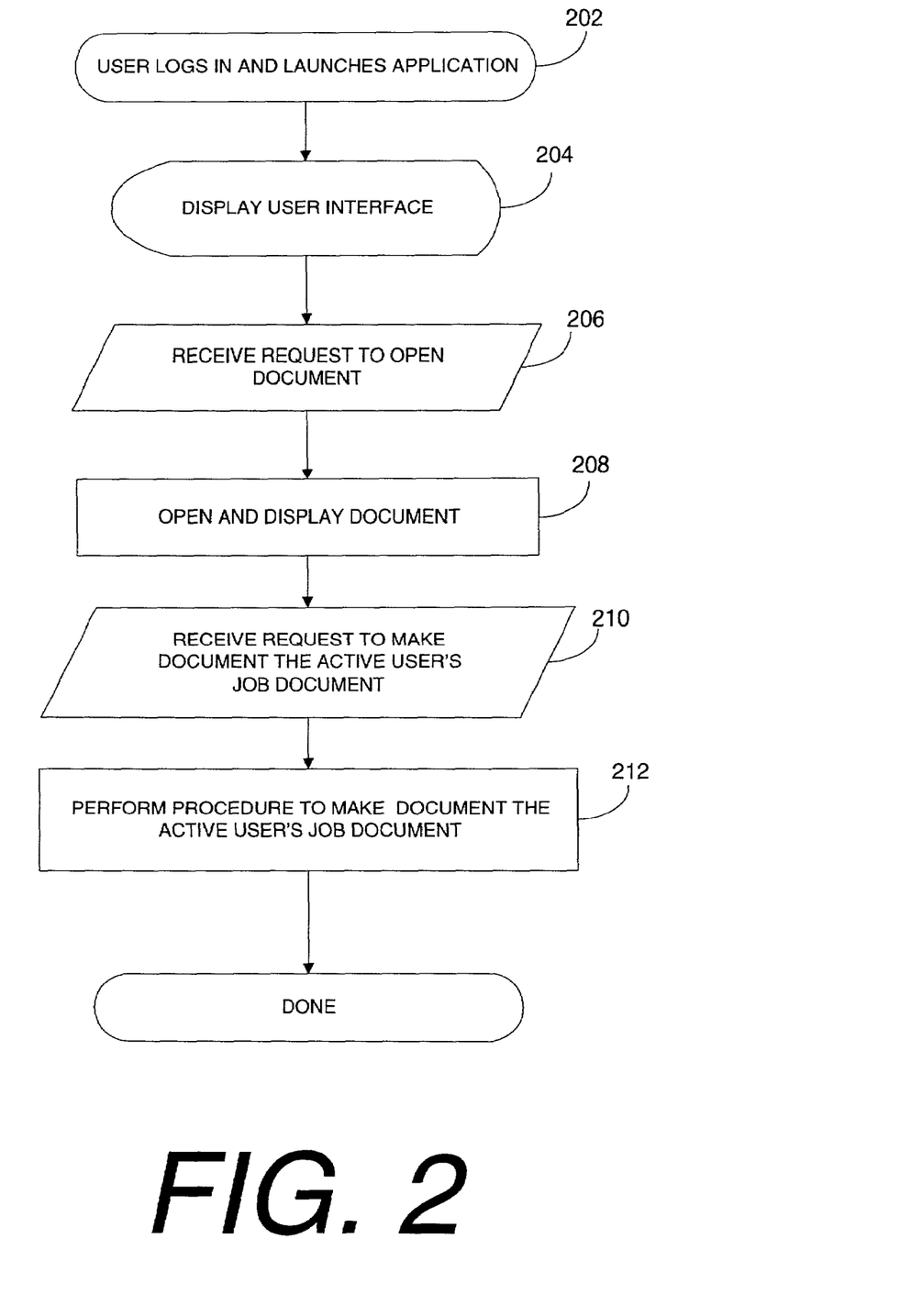
FIG. 2 is a flow diagram illustrating how a user of a PC in the system can make a job document.

FIG. 2 is a flow diagram illustrating an example of how a user can use the word processing application 125 to make a job document. Referring now to FIG. 2, a user is assumed to log on to the PC 104 and then launch the application 125 (Step 202). Upon being launched, the application 125 operates to display an initial graphical user interface (GUI) (step 204). The GUI provides various menus and options. A user can interact with the GUI to create a new document or open an existing document. A user can then input a request to make the document the user's job document.

At step 206, the application 125 is assumed to receive a user request to open a particular document. At step 208, the application 125 responds to the request by opening and displaying the document.

At step 210, the user inputs a request to make the open document the user's job document. In response to this user request, the application 125 follows a pre-determined procedure to make the document the user's job document (step 212). This involves configuring the PC 104 so that the PI function 126 will operate to link Web content (which calls the PI function) to the user specified document whenever the present user is the active user.

It is noted that certain aspects of the procedure followed in step 212 may be governed by the Web imaging standard. For example the Web imaging standard may specify the formatting of a job document (e.g., PDF). If so, the procedure may involve converting the document from its present format to the format specified by the standard. Other aspects of the procedure, however, may be governed by user preferences (e.g., the storage location of the job document). It is contemplated, for example, that the user may be given the option to specify the location he/she wishes to store his/her job document. This location may be a local or a remote storage location.

Turning again to FIG. 1, it is first noted that the primary printer 106 and the alternate printer 108 can each receive and print a print job received over the network 110.

As shown, the primary printer 106 includes an embedded WEB server 132. The embedded WEB server 132 can serve Web content 136 to a Web client, via the network 110, upon receiving an appropriate request. In some implementations, the Web content 136 may be generated dynamically. In other implementations, the Web content 136 is permanently stored in a local memory. For ease of discussion, the Web content 136 will be referred to as the "primary printer" (PP) Web content 136.

The alternate printer 108 includes an embedded Web server 142. The embedded Web server 142 can serve Web content 144 to Web clients via the network 110 upon receiving an appropriate request. In some implementations, the Web content 144 may be generated dynamically upon receiving the request. In other implementations, the Web content 144 is permanently stored in a local memory. For ease of discussion, the Web content 144 will be referred to as the "alternate printer" (AP) Web content 144.

In general, the PP Web content 136 is intended to provide clients that adhere to the Web imaging standard with a Web based printing service. For ease of discussion, this printing service will generally be referred to as the "primary printing service". In particular, the PP Web content 136 provides such clients with the ability to print a document using the primary printer 106.

As will be seen below, the AP Web content 144 also provides Web clients with a printing service. The printing service provided by the AP Web content 144 may be referred to as the "alternate printing service". The alternate printing service can be used as a "back-up" to the primary printing service in the event of a job failure.

FIGS. 3–8 are flow diagrams illustrating how a user of the PC 104 can make use of the primary and the alternate printing services. It will be assumed in the following discussion that the user has previously selected a document to be his/her job document.

Figure 3:
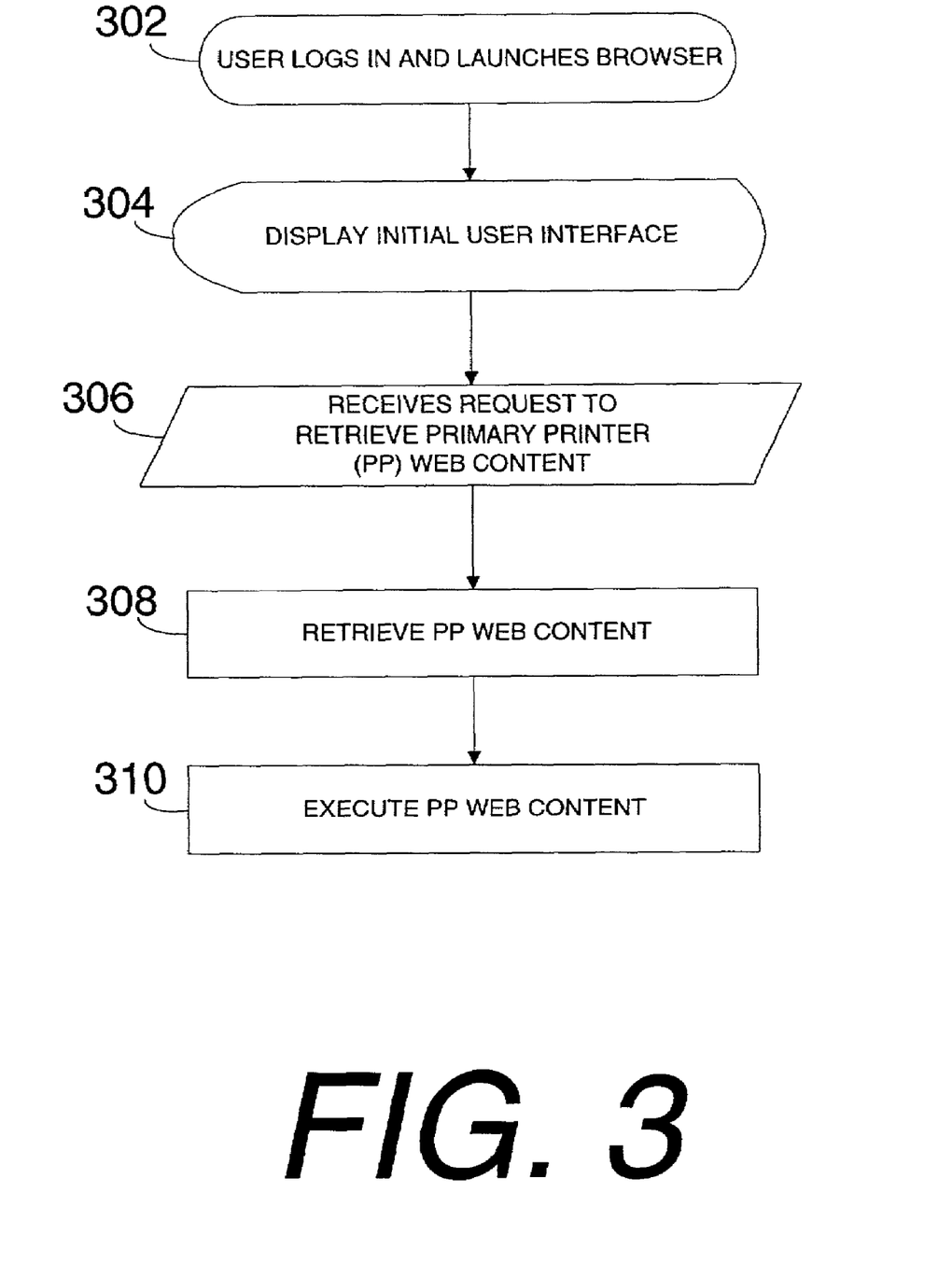
FIG. 3 is a flow diagram illustrating the operation of the PC to request and run Web content.

Turning first to FIG. 3, the user logs into the PC 104 and launches the Web Browser 124 (step 302). Upon being launched, the Web Browser 124 displays an initial GUI (step 304).

The user can interact with the GUI to request the PP Web content 136. The Browser 124 receives this user request at step 306. In response, the Browser 124 retrieves the PP Web content 136 by sending an appropriate request to the embedded Web server 132 (step 308). At step 310, the Web Browser 124 executes the PP Web content 136.

Figure 4A:
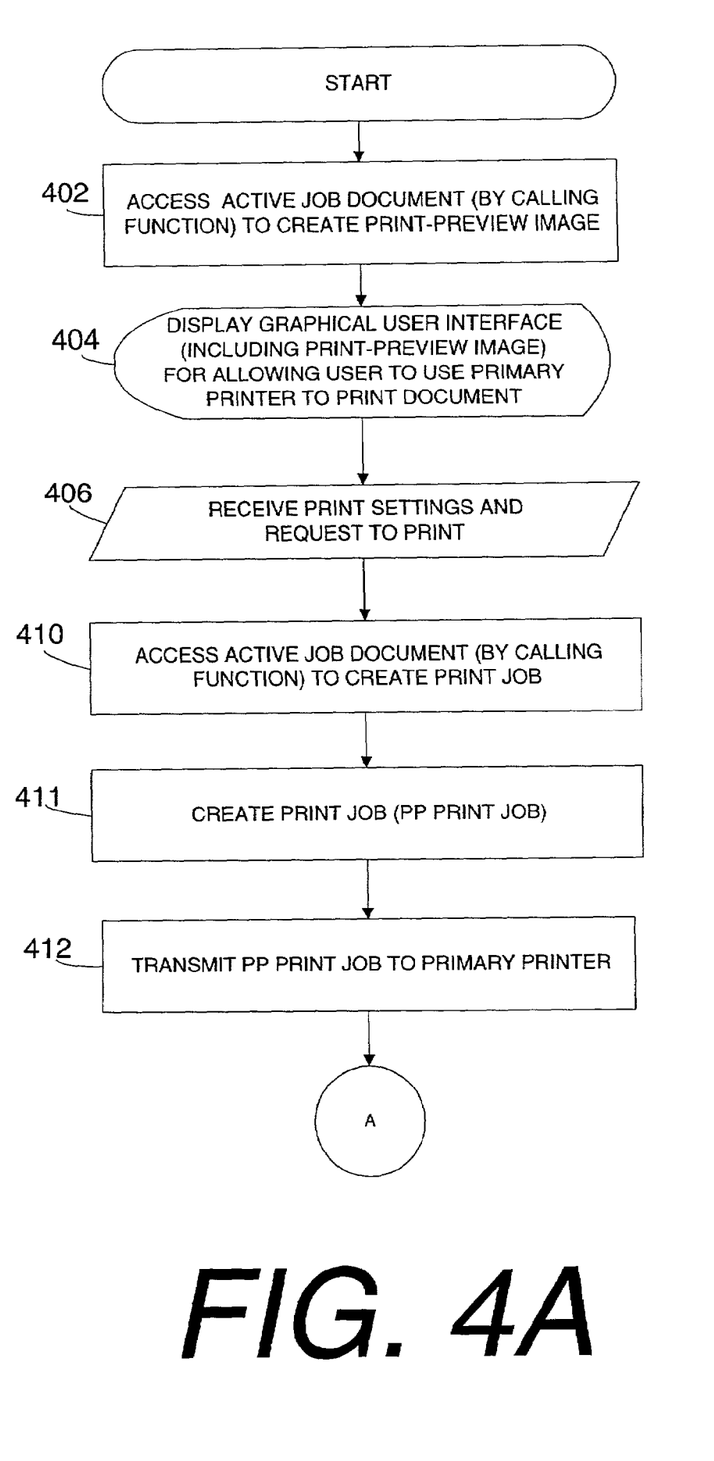
FIG. 4 is a flow diagram illustrating the operation of the PC under the direction of Web content received from the primary printer.
Figure 4B:
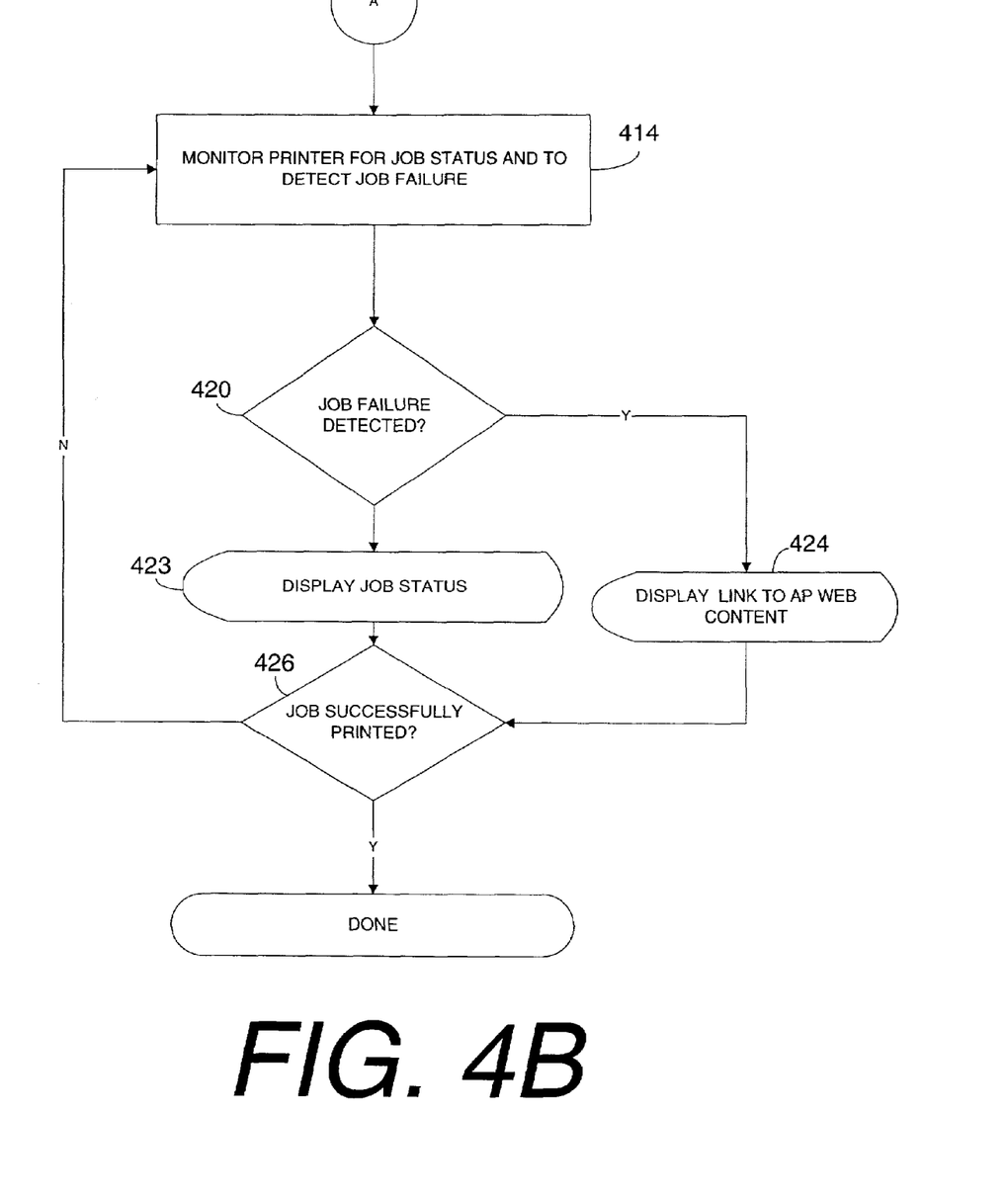

FIG. 4 is a flow diagram illustrating the operation of the PP Web content 136 at step 310. Turning now to FIG. 4, the PP Web content 136 accesses the active job document by calling the PI function 126. Thus, in this manner, the PP Web content 136 accesses a document (i.e., the active job document) that was previously selected by the active user (i.e., the user presently logged into the PC 104).

Next, the PP Web content 136 operates to display a graphical user interface that allows the user to select various printing options that are offered specifically by the primary printer 106 (step 404). For ease of discussion, the user interface displayed at step 404 may be referred to as the "PP GUI".

The PP GUI allows the user to select various print options that are offered by the primary printer 106 and to then request that the document be printed. Additionally, the PP GUI also provides a print preview image of the active job document. The print preview image is based upon the imaging information received at step 402

Figure 5:
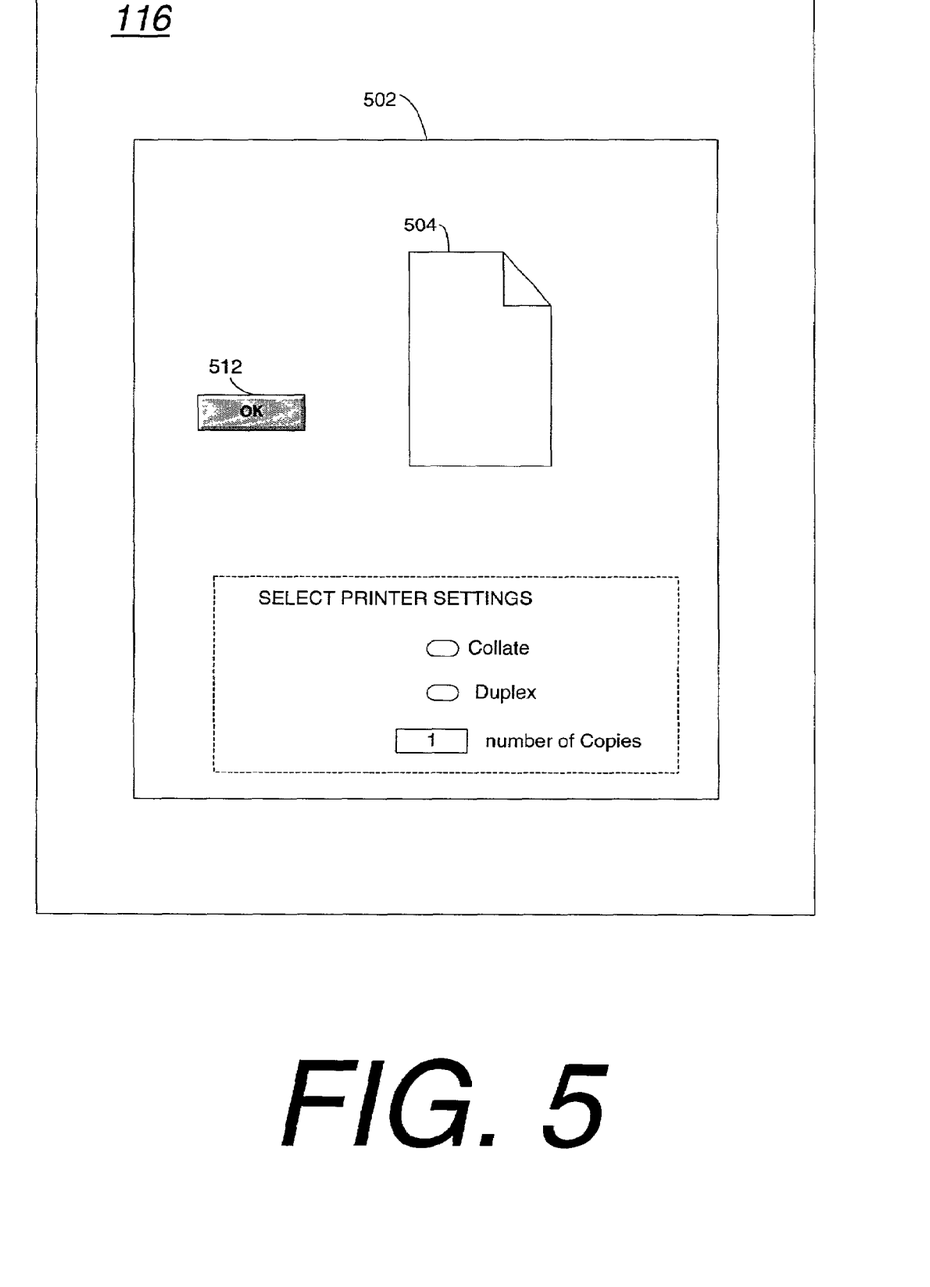
FIG. 5 provides an example of a GUI that may be displayed by the PC while operating under the direction of the Web content.

FIG. 5 provides an example of a PP GUI 502 that may be displayed at step 404 assuming the primary printer 106 offers document collation, duplex printing and multi-copy printing. In this example, the PP GUI 502 is a single Web page.

As shown, the PP GUI 502 includes a print preview image 504. The print preview image 504 provides a visual representation of how the active job document will be printed using the primary printer 106. The PP GUI 502 also allows the user to select various print options. For example, the PP GUI 502 allows the user to select a document collation option and a duplex printing option. In addition, the user can enter a number of copies he/she wishes to print of the active job document. After the user has selected his/her desired options, the user can then request the active job document be printed by selecting an "OK" button 512.

Referring again to FIG. 4, it is assumed that the user interacts with the PP GUI displayed at step 404 in order to select print options and to request the document be printed. The PC 104 receives this user input at step 406.

In response to this user input, the PP Web content 136 operates to access the active job document by again calling the interface function 126 (step 410). The PP Web content 136 then makes use of the imaging information received at step 410 and the user input received at step 406 to generate a print job. (step 411). For ease of discussion, the print job created at this step will be referred to as the "PP print job". The PP print job is suitable to print the active job document according to the print settings receives at step 406.

At step 412, the PP Web content 136 causes the PP print job to be transmitted to the printer 106 via the network 110. The primary printer 106 receives the PP print job and begins processing it.

The PP Web content 136 then begins monitoring the primary printer 106 to determine the present status of the PP print job (step 414). In particular, the PP Web content 136 monitors the PP printer 106 to determine the total number of pages that have been successfully printed. If the PP print job is a multi-copy job, the PP printer 106 also determines the total number of copies that have been successfully printed.

Additionally, the PP Web content 136 monitors the primary printer 106 to determine if the primary printer has encountered an event (job failure) that results in the printer being unable to successfully print at least a potion of the PP print job. As indicated above, a job failure may occur for various reasons. For example, a critical component in the primary printer 106 might fail while the printer is printing the PP print job.

Assuming the PP Web content 136 does not detect a job failure event at step 414, the PP Web content 136 proceeds to display the present status of the PP print job to the user (step 423). In this example, the PP Web content 136 provides this information dynamically on a Web page. For ease of discussion, the Web page displayed at step 423 may be referred to as the "job status page". The job status page may indicate the total number of pages that have been successfully printed, the number of copies that have been successfully printed, etc.

The PP Web content 136 continues to monitor the primary printer 106 to obtain the present status of the PP print job and updates the job status page with this information until either a job failure event is detected or the PP print job is successfully printed.

If a job failure is detected (decision step 420), the PP Web content 136 proceeds to automatically update the job status page to display a hyperlink (step 424). The hyperlink refers to the AP Web content 144. For ease of discussion, this hyperlink may be referred to as the "AP hyperlink". As will be seen, the AP hyperlink enables re-printing of the active job document using the alternate printer 108.

Figure 6:
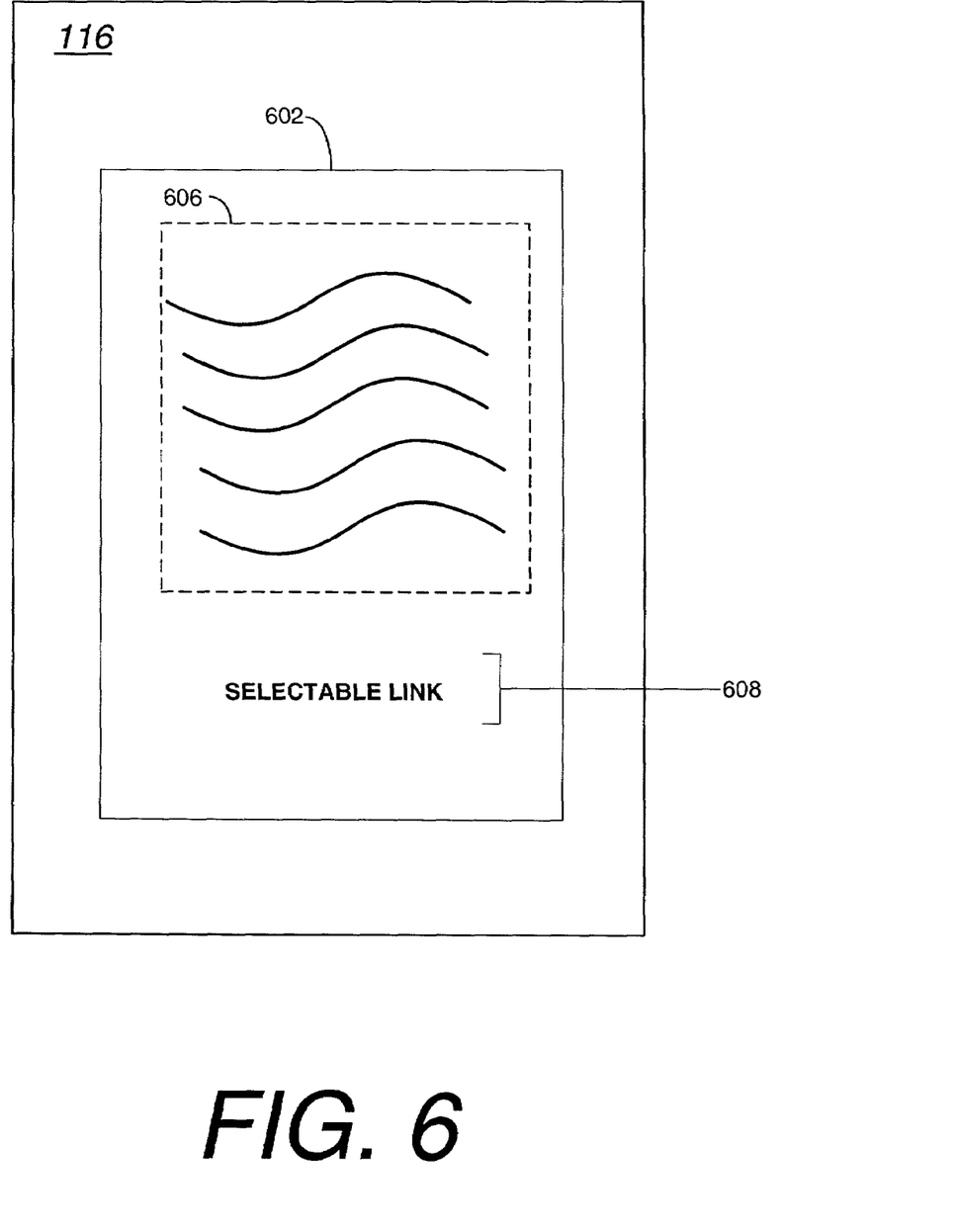
FIG. 6 is an example of a job status page that may be displayed by the PC assuming a job failure event is detected.

FIG. 6 provides an example of a job status page 602 assuming a job failure event is detected. As shown, the job status page 602 includes an information block 606 and an AP hyperlink 608. The information block 606 indicates the status of PP print job. For example, in the case wherein the PP print job is a multi-copy job, the information block 606 may indicate the total number of pages that were printed and the total number of copies successfully printed when the job failure occurred. The AP hyperlink 608 refers to the AP Web content 144.

The information block 606 also indicates that the user may re-print the active job document by selecting the AP hyperlink 608.

Figure 7:
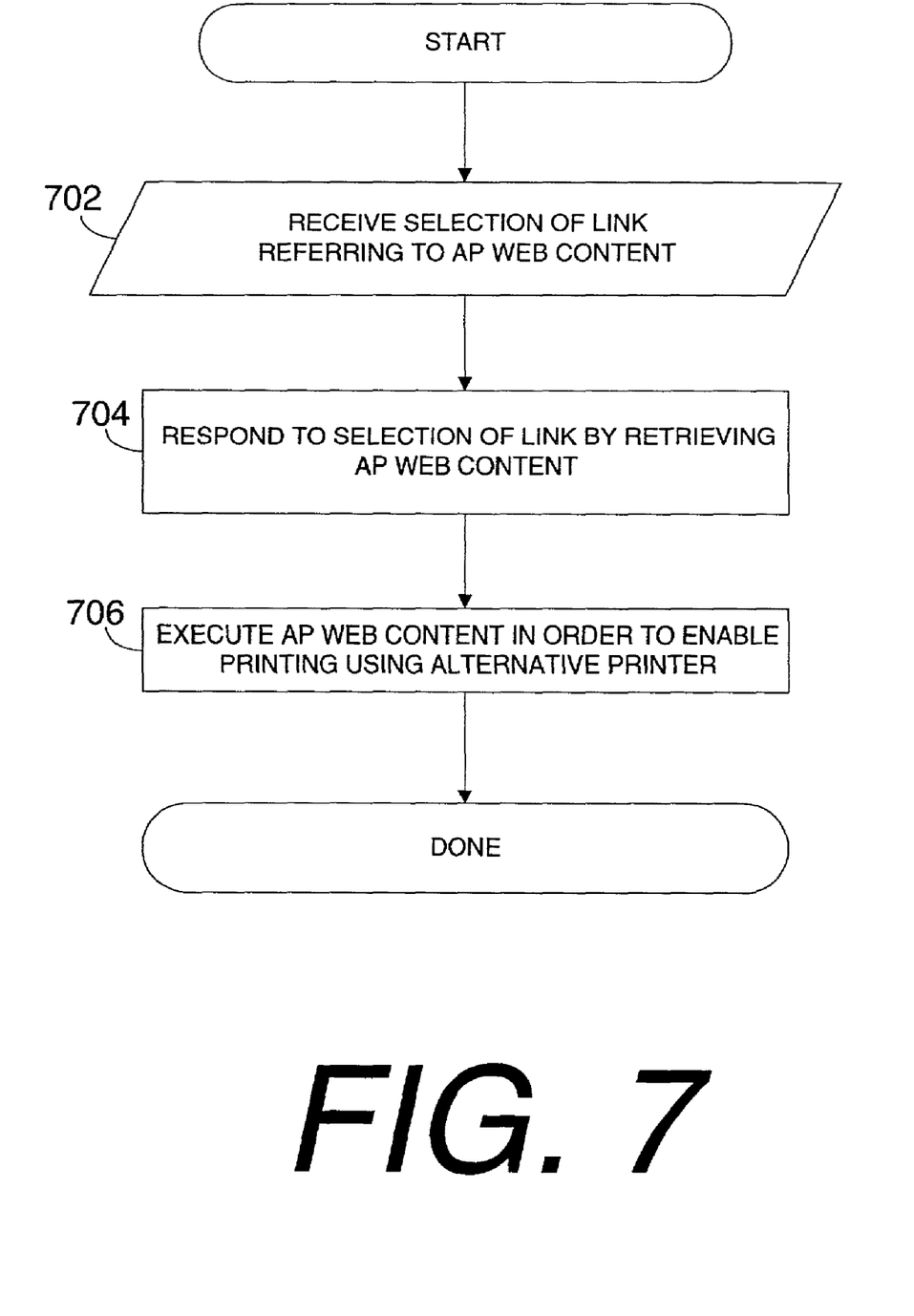
FIG. 7 is a flow diagram illustrating the operation of the Web browser assuming a user selects a hyperlink referring to Web Content provided by an alternate printer.

FIG. 7 is a flow diagram illustrating the operation of the browser 124 assuming a job failure has occurred resulting in the AP hyperlink being displayed and that the user then selects this link. Referring now to FIG. 7, the browser 124 receives the user selection of the AP hyperlink (step 702). In response, the PC 104 retrieves the AP Web content 144 (step 704) and begins executing the AP Web content 144 (step 706).

Figure 8:
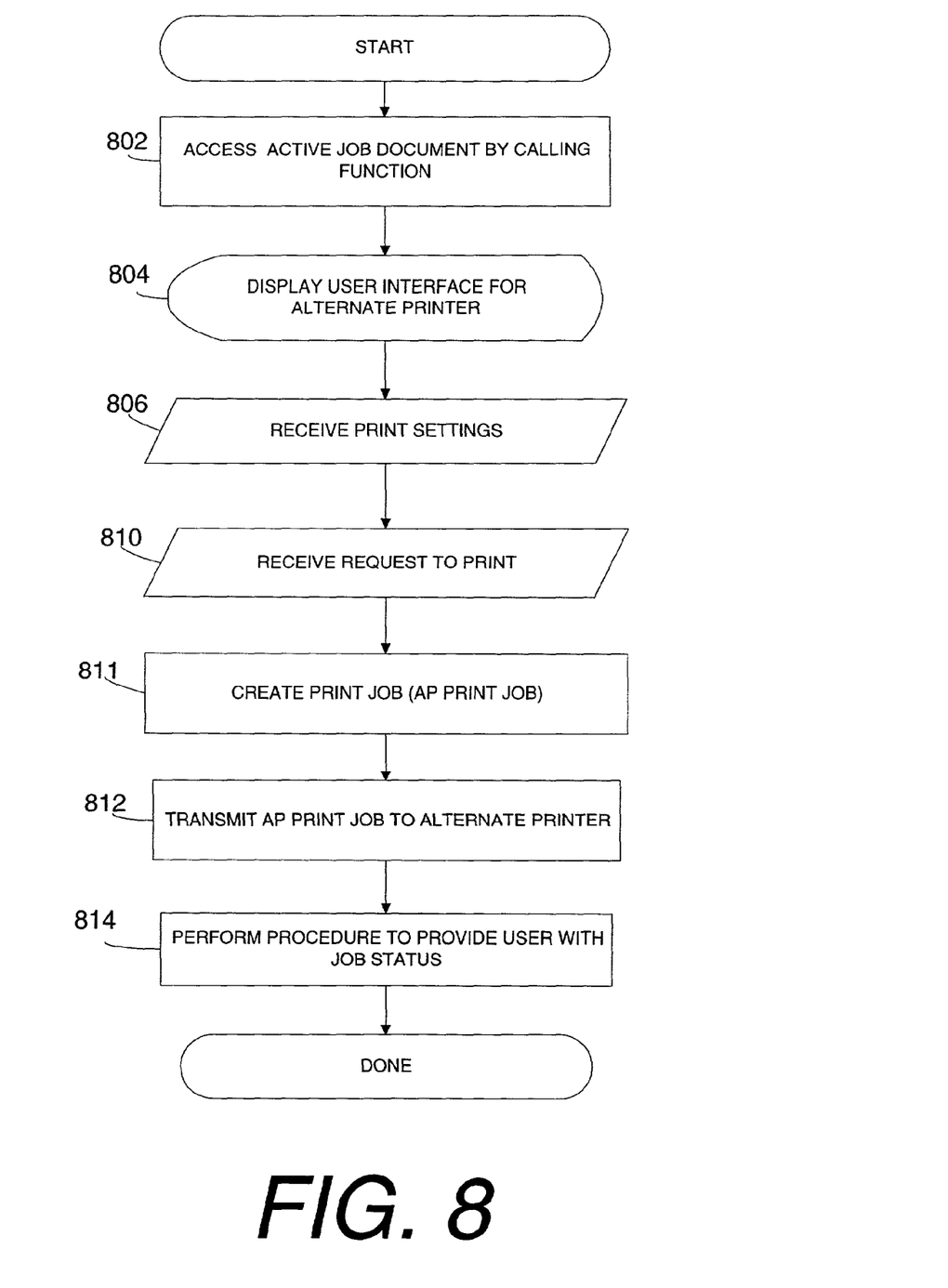
FIG. 8 is a flow diagram illustrating the operation of the PC under the direction of the Web content received from the alternate printer.

FIG. 8 is a flow diagram illustrating the operation of the AP Web content 144 at step 706. Turning now to FIG. 8, the AP Web content 144 operates to access the active job document by calling the PI function 126 (step 802). The PI function 126 responds by linking the AP WEB content 144 to the active job document. Thus, in this manner, the AP Web content 144 accesses the same document previously accessed by the PP Web content 136.

Next, the AP Web content 144 causes the PC 104 to display a graphical user interface (AP GUI) for printing the active job document using the alternate printer 108 (step 804). The AP GUI may be similar to the PP GUI. The AP GUI, however, is based upon the capabilities of the alternate printer 108.

It is assumed the user interacts with the AP GUI in order to select various print options and to then request the active job document be printed. The PC 104 receives this user input at step 806 and at step 810.

In response to this user input, the AP Web content 144 creates a print job (step 811). For ease of discussion, the print job created at step 811 will be referred to as the "AP print job". The AP print job is suitable to cause the alternate printer 108 to print the active job document according to the print settings received at step 806.

At step 812, the AP Web content 144 causes the AP print job to be transmitted to the alternate printer 108. The alternate printer 108 receives the AP print job and begins processing the AP print job in an appropriate manner. In this example, the operation of the AP Web content 144 then halts. In other embodiments, the AP Web content 144 may proceed to perform steps similar to the ones depicted in FIG. 4B. In these embodiments, however, if a job failure is detected by the AP Web content, the AP Web content may display a link to another back-up printing service. In other embodiments, the AP Web content displays a link to a Web page that provides helpful information.

From the forgoing illustrative embodiment, it will be appreciated that a printing service provided by the invention offers a number of advantages. The primary printing service just described, for example, enables clients to print a document using a particular printer and provides a link to a back-up printing service in the event of a job failure. Importantly, this gives the user the option to use the back-up printing service to re-print his/her document. The user, therefore, can decide (based upon his own personal preference) whether to use the back-up printing service. In the embodiment just described the primary printing service provides the user with information, via the job status page, that can be useful to the user in this decision.

It is noted that there are a number of variations of the embodiment just described. In a first variation, for example, the AP Web content upon being downloaded immediately operates to print the active job document without further interaction from the user.

In a second variation, the PP Web content, upon detecting a job failure condition, operates to define a set of parameter values. The parameter values indicate the boundary between the portion of the PP print job that was successfully printed and the portion that was not. The AP hyperlink displayed at step 424 is configured to, upon being selected, cause the browser 124 to transmit a request for the AP Web content, along with the parameters, to the AP embedded Web server.

The AP Web server is configured to respond to the parameter values and the request by generating AP Web content. The AP Web content enables the personal computer to print only the portion of the PP print job that was not successfully printed. In yet another variation, the AP Web content provides the user of the personal computer with the option of re-printing the entire PP print job or just the portion that failed to print.

In yet another variation, a user or system administrator selects the preferred "back-up" printing service. This preference may be stored locally by the client or may be stored in a remote storage location that is associated with the user. The PP Web content is configured to read the user's preference and to generate a link to this preferred back-up printing service when a job failure is detected.

It is also noted that the Web imaging standard represents just one model that enables a user to designate a document that he/she wishes to be accessed by Web based services. There are other models that can be used that also provide a user with this capability. For example, the operation of the client to allow a user to make a job document and to link the job document to Web content may instead be performed by a remote server. According to one specific implementation, the remote server provides a user with a means for selecting a document to be his/her job document. Upon receiving the selection, the server operates to link the selected document to an identifier assigned to the user. This ID may be the user's login name and password. The ID is subsequently used to link Web content to the user-selected document. (This connection is performed at the server, rather than within the web browser as was described earlier.) For example, at run time the Web content may request the user to input his/her ID. Upon receiving this input, the Web content sends the user's ID to the server to obtain the document (i.e., the user's job document) that is linked to the user's ID. In this manner, therefore, the Web server is able to access the user's pre-selected job document and use that document to synthesize Web content based on that access.

It is important to also note that the present invention may be embodied in the form of a "computer readable medium" that has any one of the programs described above embodied therein. For example, a memory that stores (either temporarily or permanently) the PP Web content just described may be considered an embodiment of the invention. It is noted that the phrase "computer readable medium" can refer to any medium that can contain, store or propagate computer readable instructions. Thus, in this context, computer readable medium may refer to a medium such as a CD ROM or to signals that are used to communicate computer readable instructions (e.g., the PP Web content) over a network, such as the public Internet. A computer readable medium may also refer to a carrier wave.

Although several specific embodiments of the invention has been described and illustrated, the invention is not to be limited to specific forms or arrangements of parts so described and illustrated. The invention is limited only by the claims and the equivalents thereof.

What is claimed is:

1. In a computer, a method of printing a document, comprising:
   (a) initiating the printing of the document by a first printer;
   (b) detecting that the first printer has encountered an event; and
   (c) automatically displaying a selectable link referring to a network resource that enables the computer to print at least a portion of the document using a second printer;
   wherein step (c) is automatically performed in response to step (b);
   wherein the event occurs while the first printer is printing the document;
   wherein the event is an error condition that results in the first printer not printing a portion of the document;
   wherein the link is a hyperlink and the resource is Web content provided by a remote server.

2. The method of claim 1, wherein the resource enables the computer to print only the portion of the document that was not printed by the first printer.

3. The method of claim 1, wherein the resource enables the computer to provide a user an option to print the entire document or only the portion of the document that was not printed.

4. The method of claim 1, wherein the second printer includes the remote server.

5. The method of claim 1, further comprising:
   (d) receiving user input indicating the identity of the network resource;
   (e) generating the hyperlink based upon the user input.

6. A server, comprising:
   (a) means for receiving a request from a computer;
   (b) means for responding to the request by transmitting a first program of computer readable instructions to the computer, the first program for enabling the computer to;
   (i) initiate the printing of a document by a first printer;
   (ii) monitor the first printer to detect if the first printer encounters an event while printing the document;
   (iii) if the event is detected, display a selectable link referring to a second program of instructions that enables the computer to use an alternate printer to print at least a portion of the document; and
   (c) wherein the second program is Web content served by a remote server.

7. The server of claim 6, wherein the first printer includes the server.

8. The sewer or claim 6, wherein the document is pre-selected by a user of the computer.

9. The server of claim 6, wherein the event is an error condition that results in the first printer not printing a portion of the document and the second program of instructions enables the computer to print only the document portion not printed by the first printer.

10. The server of claim 6, wherein the event is an error condition that results in the first printer not printing a portion of the document and the second program enables the computer to provide a user with an option to print the entire document using the alternate printer or to print only the portion of the document that was not printed by the first printer.

11. The server system of claim 6, wherein the second program enables the computer to print the entire document using the alternate printer.

12. The server of claim 6, wherein the event is an error condition that results in the first printer not printing a portion of the document and the first program further enables the computer to:
   (iv) respond to the event being detected by generating at least one parameter that indicates the boundary between the portion of the document that was printed and the portion that was not; and
   (v) configure the link so that the when the link is selected the computer operates to transmit the following to a second server: a request for the second program of instructions and the at least one parameter.

13. A printing device, comprising:
   a Web server configured to respond to a pre-defined request received over a network from a computer by serving a first program of computer readable instructions to the computer, the first program for enabling the computer to:
   (a) initiate the printing of a document by using the printing device;
   (b) detect if the first printing device encounters an event while printing the document; and
   (c) if the event is detected, display a selectable link referring to a second program of instructions that enables the computer to use an alternate printer to print at least a portion of the document;
   (d) wherein the first program is Web content.

14. The printing device of claim 13, further comprising: apparatus for printing the document.

15. A printing system, comprising:
   (a) a client; and
   (b) a server operable to receive a pre-defined request from the client and to respond thereto by serving a first program of instructions to the client; and wherein the first program of instructions enables the client to:
   initiate printing of the document by a first printer;
   detect if the first printer encounters an event while printing the document;
   automatically display a selectable link referring to a second program of instructions that enables the client to use an alternate printer to print at least a portion of the document;
   wherein the first program of instructions is Web content and the server is a Web server.

16. The system of claim 15, wherein the first printer is the server.

17. The system of claim 15, wherein the event is of a type that prevents the first printer from successfully printing the document.

18. A server, comprising:
   apparatus to respond to a pre-defined request over a network from a client by serving a first program of instructions to the client; and wherein the first program of instructions enables the client to:
   initiate printing of the document by a first printer;
   detect if the first printer encounters an event while printing the document;
   automatically display a selectable link referring to a second program of instructions that enables the client to use an alternate printer to print at least a portion of the document; and
   wherein the first program of instructions is web content and the server is a WEB server.

19. The server of claim 18, wherein the event is of a type that prevents the first printer from successfully printing the document.

* * * * *

UNITED STATES PATENT AND TRADEMARK OFFICE
CERTIFICATE OF CORRECTION

PATENT NO. : 7,064,853 B2  Page 1 of 1
APPLICATION NO. : 10/032681
DATED : June 20, 2006
INVENTOR(S) : Shell S. Simpson et al.

It is certified that error appears in the above-identified patent and that said Letters Patent is hereby corrected as shown below:

In column 8, line 56, in Claim 6, after "to" delete ";" and insert -- : --, therefor.

In column 9, line 1, in Claim 8, delete "sewer or" and insert -- server of --, therefor.

In column 9, line 31, in Claim 13, delete "Web" and insert -- WEB --, therefor.

In column 10, line 37, in Claim 18, delete "web" and insert -- Web --, therefor.

Signed and Sealed this

Eighteenth Day of August, 2009

David J. Kappos
*Director of the United States Patent and Trademark Office*